United States Patent
Kirnasov et al.

(10) Patent No.: US 7,797,485 B2
(45) Date of Patent: Sep. 14, 2010

(54) METHOD AND APPARATUS FOR ALLOCATING DISC SPACE FOR RECORDING FILES

(75) Inventors: Alexander Kirnasov, Suwon-si (KR); Joo-young Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 199 days.

(21) Appl. No.: 11/745,635

(22) Filed: May 8, 2007

(65) Prior Publication Data
US 2007/0271436 A1    Nov. 22, 2007

(30) Foreign Application Priority Data
May 18, 2006    (KR) .................. 10-2006-0044657

(51) Int. Cl.
*G06F 12/02* (2006.01)
(52) U.S. Cl. .................. 711/112; 711/165; 711/171; 711/E12.007
(58) Field of Classification Search .............. 711/112, 711/165, E12.007
See application file for complete search history.

(56) References Cited

U.S. PATENT DOCUMENTS

| | | | | |
|---|---|---|---|---|
| 5,339,411 | A | * | 8/1994 | Heaton, Jr. .................. 711/171 |
| 5,390,315 | A | * | 2/1995 | Blandy et al. ................ 711/112 |
| 5,481,702 | A | * | 1/1996 | Takahashi .................... 707/205 |
| 5,696,921 | A | * | 12/1997 | Holt .............................. 711/4 |
| 6,564,292 | B2 | * | 5/2003 | Wei Loon et al. ........... 711/111 |
| 6,654,878 | B1 | * | 11/2003 | Swanberg et al. ........... 712/234 |
| 6,735,678 | B2 | * | 5/2004 | Noble et al. ................. 711/165 |
| 6,745,311 | B2 | | 6/2004 | Fabrizio et al. |
| 6,874,061 | B1 | * | 3/2005 | Bridge ........................ 711/114 |
| 2001/0012446 | A1 | | 8/2001 | Kizu et al. |
| 2002/0095546 | A1 | * | 7/2002 | Dimitri et al. ............... 711/112 |

(Continued)

FOREIGN PATENT DOCUMENTS

WO    WO 97/16783    5/1997

OTHER PUBLICATIONS

Sage A. Weil. "Leveraging Intra-object Locality with EBOFS." Nov. 19, 2004. http://www.soe.ucsc.edu/~sage/papers/cs229-project.pdf.*

(Continued)

*Primary Examiner*—Reginald G Bragdon
*Assistant Examiner*—Nathan Sadler
(74) *Attorney, Agent, or Firm*—NSIP Law

(57) ABSTRACT

A method and apparatus for allocating disc space for recording files, the method including: detecting one or more first sets, each comprising one or more empty sections of the disc that are larger than a predetermined reference value; detecting one or more second sets, each comprising one or more empty sections that are equal to or larger than a size of the data when combined; and allocating, to the data, an optimum set that results in a shortest seek time from a predetermined reference point. Accordingly, it is possible to effectively allocate empty disc space in consideration of both the distances of empty disc sections to a reference point and seek time, thus reducing the time taken to seek target data compared to methods of allocating disc space that only consider the distances of empty disc sections to a reference point.

31 Claims, 5 Drawing Sheets

U.S. PATENT DOCUMENTS

| | | | |
|---|---|---|---|
| 2002/0169932 A1* | 11/2002 | Burns et al. | 711/154 |
| 2005/0019002 A1 | 1/2005 | Okabe et al. | |
| 2005/0188151 A1 | 8/2005 | Lee | |
| 2006/0288156 A1 | 12/2006 | Fish et al. | |
| 2008/0183777 A1* | 7/2008 | Xi et al. | 707/205 |

OTHER PUBLICATIONS

IBM. "Structure and Allocation of an Extent." Nov. 16, 2005. http://publib.boulder.ibm.com/infocenter/ids9help/index.jsp?topic=/com.ibm.adref.doc/adref232.htm.*

Jiri Schindler, John Linwood Griffin, Christopher R. Lumb, and Gregory R. Ganger. "Track-aligned Extents: Matching Access Patterns to Disk Drive Characteristics." Jan. 2002. Usenix. FAST '02.*

Randal C. Burns, Robert M. Rees Zachary, N. J. Peterson, and Darrell D. E. Long. "Allocation and Data Placement Using Virtual Contiguity." iNIST/SSRC/01-001. 2001.*

James L. Hein. Discrete Mathematics. 1996. Jones and Bartlett Publishers. pp. 10-12.*

Search Report issued in European Patent Application No. 07107254.0 on Aug. 20, 2008.

* cited by examiner

METHOD AND APPARATUS FOR ALLOCATING DISC SPACE FOR RECORDING FILES

CROSS-REFERENCE TO RELATED APPLICATION

This application claims the benefit of Korean Application No. 2006-44657, filed May 18, 2006 in the Korean Intellectual Property Office, the disclosure of which is incorporated herein by reference.

BACKGROUND OF THE INVENTION

1. Field of the Invention

Aspects of the present invention relate to a file system, and more particularly, to a method and apparatus for allocating disc space for recording files.

2. Description of the Related Art

A variety of file systems (such as FAT, XFS, and Ext2) aim at storing a file in a disc such that the data elements of the file can be recorded as close together as possible, thus minimizing the time for a disc head to seek the file. In order to store the data of the file in close proximity to one another, empty disc space must be appropriately allocated.

FIG. 1 is a diagram explaining a conventional method of allocating empty disc space. Referring to FIG. 1, reference characters a through j indicate blocks. The size of the blocks a through j vary from one file system to another. Referring to FIG. 1, dark blocks indicate blocks to which data has already been allocated, and white blocks indicate empty blocks. A reference point indicates a location where data to be stored (target data) and data related to the target data have been most recently stored (i.e., a location where a disc head is currently located to read the target data).

A seek time becomes longer as the distance from the reference point becomes greater. Accordingly, a sufficient number of empty blocks to cover the size of the target data are allocated in increasing order of distance from the reference point. Referring to FIG. 1, the white blocks d, f, i, and j are sequentially allocated from the reference point.

However, when a file to be read is distributed over a plurality of blocks, the distances between a reference point and the blocks are not necessarily proportional to the time taken to seek the file. In general, the time taken to seek a file that is distributed over a plurality of consecutive blocks is shorter than the time taken to seek a file that is distributed over a plurality of nonconsecutive blocks. Thus, when data related to a file is distributed over a plurality of blocks, an exact seek time can be determined according to a seek curve of a file system. For example, referring to FIG. 1, assuming that the size of the target data amounts to the size of two blocks combined, the shortest seek time can be guaranteed by allocating the blocks i and j to the target data. However, according to the conventional method of allocating, empty blocks are allocated to the target data simply based on their distances from the reference point. Thus, the blocks d and f, instead of the blocks i and j, are allocated to the target data, thereby failing to provide an optimum block allocation.

SUMMARY OF THE INVENTION

Aspects of the present invention provide an apparatus and method for allocating disc space in consideration of actual seek time according to the sizes of empty sections.

Additional aspects and/or advantages of the invention will be set forth in part in the description which follows and, in part, will be obvious from the description, or may be learned by practice of the invention.

According to an aspect of the present invention, there is provided a method of allocating disc space for recording data on a disc, the method including: detecting one or more first sets, each comprising one or more empty sections of the disc that are larger than a predetermined reference value; detecting one or more second sets, each comprising one or more empty sections from the one or more first sets that are equal to or larger than a size of the data when combined; and allocating, to the data, an optimum set of the one or more second sets that results in a shortest seek time from a predetermined reference point.

According to an aspect of the present invention, f no one or more second sets are detected, the method may also include allocating an empty section, to the data, that is located within a predetermined range of the reference point and is larger than the size of the data.

According to an aspect of the present invention, the method may also include, if no empty section that is larger than the data and within the predetermined range of the reference point exists, allocating an empty section, to the data, that is outside of the predetermined range of the reference point and is larger than the size of the data.

According to an aspect of the present invention, the method may also include, if no empty section that is larger than the data exists on the disc, allocating a largest empty section on the disk to a part of the data, and if no empty sections remain on the disc, outputting an error message; and if the largest empty section is allocated to the data, setting the end of the allocated empty section in as a new reference point, setting a size of a portion of the data remaining uncovered by the allocation of the largest empty section as a new data size, and performing the detecting of the one or more first sets, the detecting of the one or more second sets, the allocating of the optimum set, the allocating of the empty section that is located within the predetermined range, the allocating of the empty section that is outside of the predetermined range, and the allocating of the largest empty section again.

According to an aspect of the present invention, the performing of the detecting of the one or more first sets, the detecting of the one or more second sets, the allocating of the optimum set, the allocating of the empty section that is located within the predetermined range, the allocating of the empty section that is outside of the predetermined range, and the allocating of the largest empty section again may be repeatedly performed until an error message is output or until the entire data is covered.

According to an aspect of the present invention, if more than one empty section that is larger than the data and within the predetermined range of the reference point, an empty section that is closest to the reference point may be allocated to the data.

According to an aspect of the present invention, if more than one empty sections that is larger than the data and outside of the predetermined range of the reference point, an empty section that is closest to the reference point may be allocated to the data.

According to another aspect of the present invention, there is provided a computer-readable recording medium having recorded thereon a computer program for executing the method.

According to another aspect of the present invention, there is provided an apparatus to allocate disc space for recording data on a disc, the apparatus including a first algorithm execution unit to detect one or more first sets, each comprising one or more empty sections of the disc that are larger than a corresponding predetermined reference value, to detect one or more second sets, each comprising one or more empty sections from the one or more first sets that are equal to or larger than a predetermined reference value, and to execute a first algorithm to allocate, to the data, an optimum set of the one or more second sets that results in a shortest seek time from a predetermined reference point.

According to an aspect of the present invention, the apparatus may also include a second algorithm execution unit to allocate an empty section that is located within a predetermined range of the reference point and is larger than the data to the data if no set is detected by the first algorithm; to allocate an empty section that is outside of the predetermined range of the reference point and is larger than the data to the data if no empty section that is larger than the data remains within the predetermined range of the reference point; to allocate the largest empty section remaining on the disk to the data if no empty section that is larger than the data, remains outside the predetermined range; and to output an error message if no empty sections remain within and outside of the predetermined range of the reference point.

According to an aspect of the present invention, the apparatus may also include a control unit to, if the second algorithm execution unit allocates the largest empty section, set an end of the allocated largest empty section as a new reference point, set a size of a portion of the data remaining uncovered by the allocation of the largest empty section as a new data size, and the first algorithm execution unit and the second algorithm execution unit to repeatedly detect the one or more first sets, detect the one or more second sets, execute the first algorithm, and allocate the empty section until all of the data has an allocated disc space or until no more space remains on the disc.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
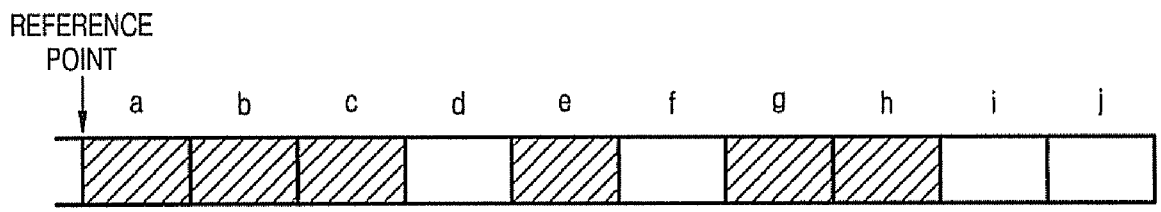
FIG. 1 is a diagram explaining a conventional method of allocating empty disc space.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
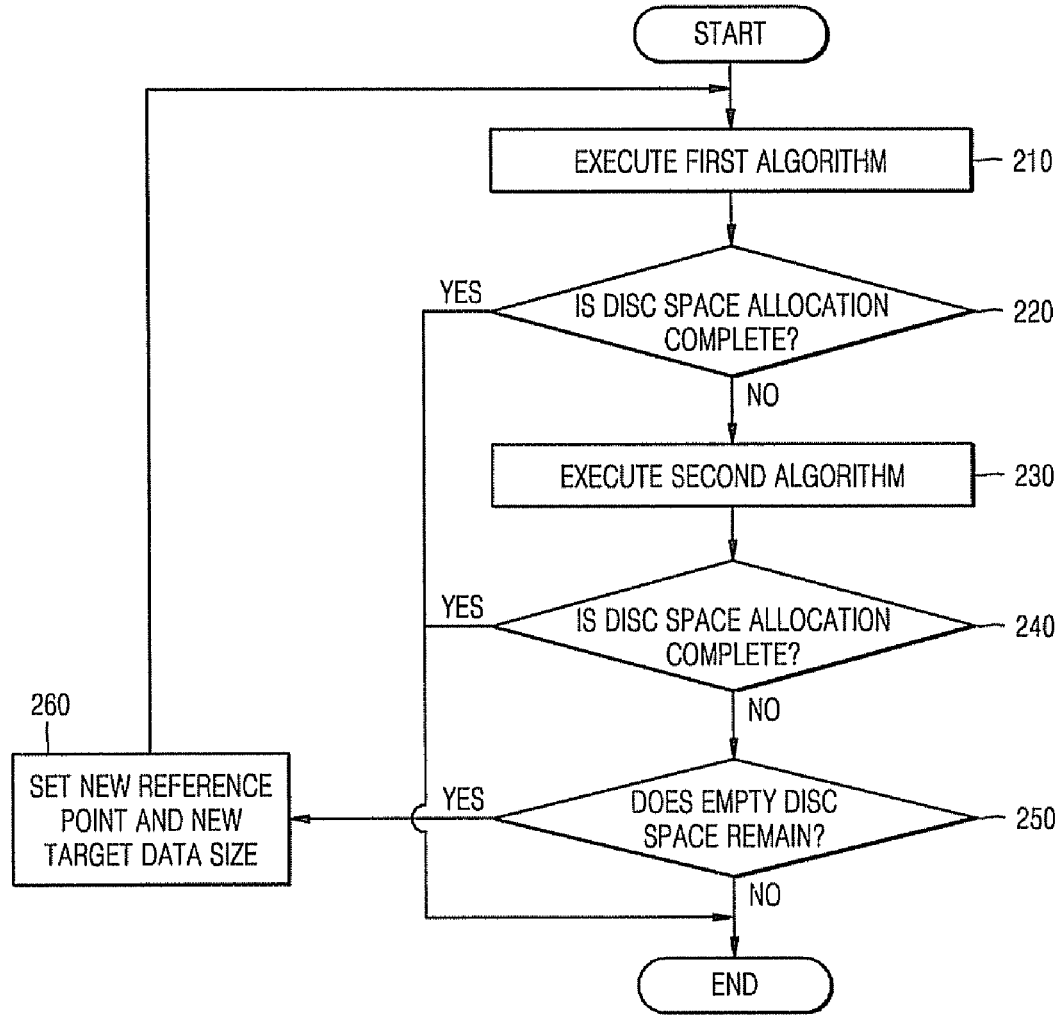
FIG. 2 is a flowchart illustrating a method of allocating disc space according to an embodiment of the present invention.

FIG. 2 is a flowchart illustrating a method of allocating disc space according to an embodiment of the present invention. Referring to FIG. 2, in operation 210, a first algorithm is executed. The first algorithm is a method of allocating empty sections larger than a predetermined size within a predetermined distance from a reference point. Here, a section indicates one block or a plurality of consecutive blocks. The first algorithm will be described in further detail with reference to FIG. 3.

In operation 220, it is determined whether all sufficient disc space to store target data has been allocated. In operation 230, if it is determined in operation 220 that not all of the sufficient disc space to store the target data has been allocated, then a second algorithm is executed. The second algorithm is a method of allocating empty sections in decreasing order of size, and will be described later in further detail with reference to FIG. 4. If it is determined in operation 220 that space allocation is complete, the method ends.

In operation 240, it is determined whether the sufficient disc space to store the target data has all been allocated. In operation 250, if it is determined in operation 240 that not all the sufficient disc space to store the target data has been allocated, it is determined whether there is empty disc space remaining unallocated. In operation 260, if it is determined in operation 250 that there is empty disc space left unallocated, a new reference point and a new target data size are set, thereby generating a new input value for the re-execution of the first algorithm. Then, the first and second algorithms are alternately executed until the entire target data is covered or until no empty disc space remains unallocated. If it is determined in operation 240 that the space allocation is complete or if it is determined in operation 250 that no empty space remains, the method ends.

Figure 3:
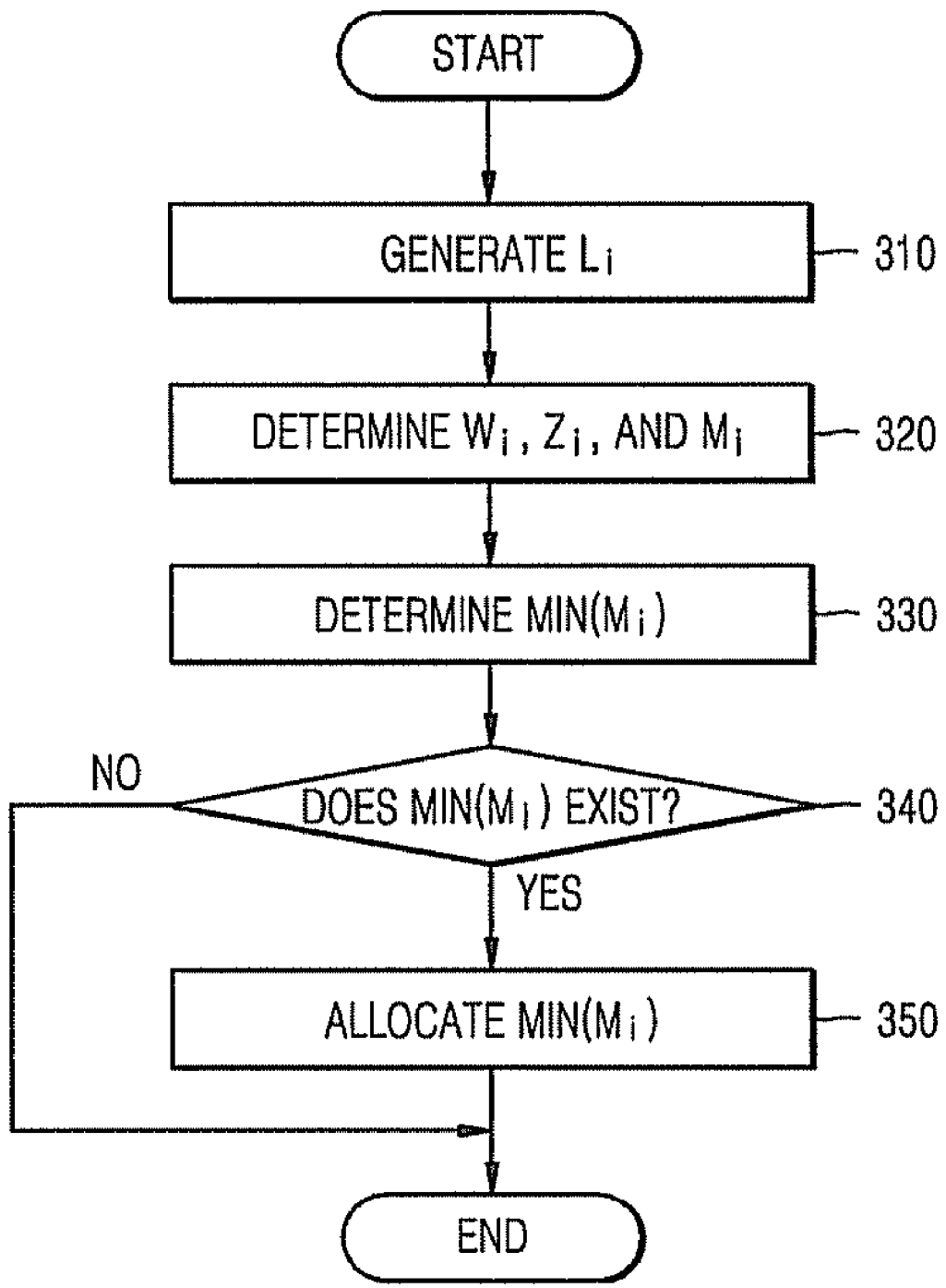
FIG. 3 is a flowchart illustrating an embodiment of the execution of a first algorithm.

FIG. 3 is a flowchart illustrating an embodiment of the execution of the first algorithm (i.e., operation 210 illustrated in FIG. 2). In general, most file systems manage metadata regarding empty disc space. For example, XFS manages empty disc space by aligning and managing empty sections of a disc according to the locations and sizes of the empty sections using a B+ tree. According to the shown embodiment, metadata $L_i$ (where i is an integer within a predefined range) is used. Here, $L_i$ indicates a set including one or more empty sections that are larger than the size of $2_i$ blocks combined. According to an aspect of the present invention, $L_i$ is generated, not for all integer values, but for only certain integer values that fall within the predefined range. According to the present embodiment, $L_i$ is generated only for the integer values that satisfy the following equation: $i_1 \leq i \leq i_2$.

Referring to FIG. 3, in operation 310, $L_i$ is generated. The generation of $L_i$ involves determining $i_1$ and $i_2$ which set the range of i, i.e., determining a minimum size of empty sections to which target data is allocated during the execution of the first algorithm. For example, $i_1$ and $i_2$ may be determined so that $i_2 = \min(N, \lceil \log_2(req\_len) \rceil)$ and that $i_1 = \max(\lceil \log_2$ (req_len)]−C, 0), wherein req_len indicates the size of the target data; C is a constant; N=[log$_2$(V/B)]; V indicates the storage capacity of an entire disc; B indicates the size of blocks of a file system;][ is a mathematical operator that raises a value to the closest integer greater than the original value; and [ ] is a mathematical operator that lowers a value to the closest integer smaller than the original value. A maximum i value is determined by the target data size req_len, and a minimum i value is determined by the constant C. The constant C can be chosen by experimentation in order to obtain an optimum disc space allocation.

In operation 320, $W_i$, $Z_i$, and $M_i$ are determined. $W_i$ is a set including a predefined number of empty sections that are chosen from among a plurality of empty sections included in $L_i$. In detail, $W_i$ comprises u empty sections $I_1, I_2, I_3, \ldots,$ and $I_u$ that are on the left side of a reference point of $L_i$, and v empty sections $r_1, r_2, r_3, \ldots,$ and $r_v$ on the right side of the reference point That is, according to an aspect of the present invention, the seek range is limited by imposing conditions for u and v, as it is uneconomical to seek through all the empty sections belonging to $L_i$ for all the integer values within the predetermined range. The conditions for u are as follows: (1) u≦]req_len/2$^i$[; and (2) I($I_1$)+I($I_2$)+ . . . I($I_u$)≧req_len and I($I_1$)+I($I_2$)+ . . . I($I_{u−1}$)<req_len, or I($I_1$)+I($I_2$)+ . . . I($I_u$)≧req_len. The conditions for v are as follows: (1) v≦]req_len/2$^i$[; and (2) I($r_1$)+I($r_2$)+ . . . I($r_v$)≧req_len and I($r_1$)+I($r_2$)+ . . . I($r_{v−1}$)≧req_len, or I($r_1$)+I($r_2$)+ . . . I($r_v$)<req_len. Here, I(x) is a function indicating the size of an empty section x.

In short, $W_i$ comprises a minimum number of empty sections that are larger than the size of the target data and are on the left side of the reference point of $L_i$ (the u empty sections $I_1, I_2, I_3, \ldots, I_u$), and a minimum number of empty sections that are larger than the size of the target data and are on the right side of the reference point of $L_i$ (the v empty sections $r_1, r_2, r_3, \ldots, r_v$). Here, $I_{k+1}$ is more distant than $I_k$ from the reference point of $L_i$. According to an aspect of the present invention, u and v may be determined so that the collective size of the u empty sections $I_1, I_2, I_3, \ldots, I_u$ and the collective size of the v empty sections $r_1, r_2, r_3, \ldots, r_v$ may each be smaller than the size of the target data. In other words, since the first algorithm aims at securing empty space larger than the size of the target data and then allocating the secured empty space to the target data, it is acceptable that the collective size of the u empty sections $I_1, I_2, I_3, \ldots, I_u$ and the collective size of the v empty sections $r_1, r_2, r_3, \ldots, r_v$ are each smaller than the size of the target data, as long as the collective size of all of the empty sections included in $W_i$ (the u empty sections $I_1, I_2, I_3, \ldots, I_u$ and the v empty sections $r_1, r_2, r_3, \ldots, r_v$ combined) is larger than the size of the target data.

$Z_i$ is a set including a number of sets of w consecutive empty sections $z_{i1}, z_{i2}, \ldots, z_{iw}$ that are detected from among the empty sections included in $W_i$. As described above, $W_i$ includes u+v empty sections. $Z_i$ is a set of sets that can be made up of w consecutive empty sections detected from among the u+v empty sections. Here, w is a minimum value for securing empty space larger than the size of the target data. In other words, I($z_{i1}$)+I($z_{i2}$)+ . . . +I($z_{iw}$)≧req_len and, I($z_{i1}$)+I($z_{i2}$)+ . . . +I($z_{i(w−1)}$)≧req_len.

$M_i$ is one of the sets of $Z_i$ that can result in a shortest seek time. In detail, $Z_i$ includes one or more sets as described above. $M_i$ is determined as the set included in $Z_i$ that results in the shortest seek time. In other words, $M_i$ is an optimum set that is made up of the empty sections included in $W_i$ for allocating the target data.

In operation 330, an optimum empty section set min($M_i$) that can result in the shortest seek time is detected from among a plurality of optimum empty sections $M_i$ obtained in operation 320. In operation 340, it is determined whether the optimum empty section set min($M_i$) exists. In operation 350, if it is determined in operation 340 that the optimum empty section set min($M_i$) exists, empty sections belonging to the optimum empty section set min($M_i$) are allocated to the target data. However, if it is determined in operation 340 that the optimum empty section set min($M_i$) does not exist, then the execution of the first algorithm is terminated, and the execution of the second algorithm begins in operation 230.

Figure 4:
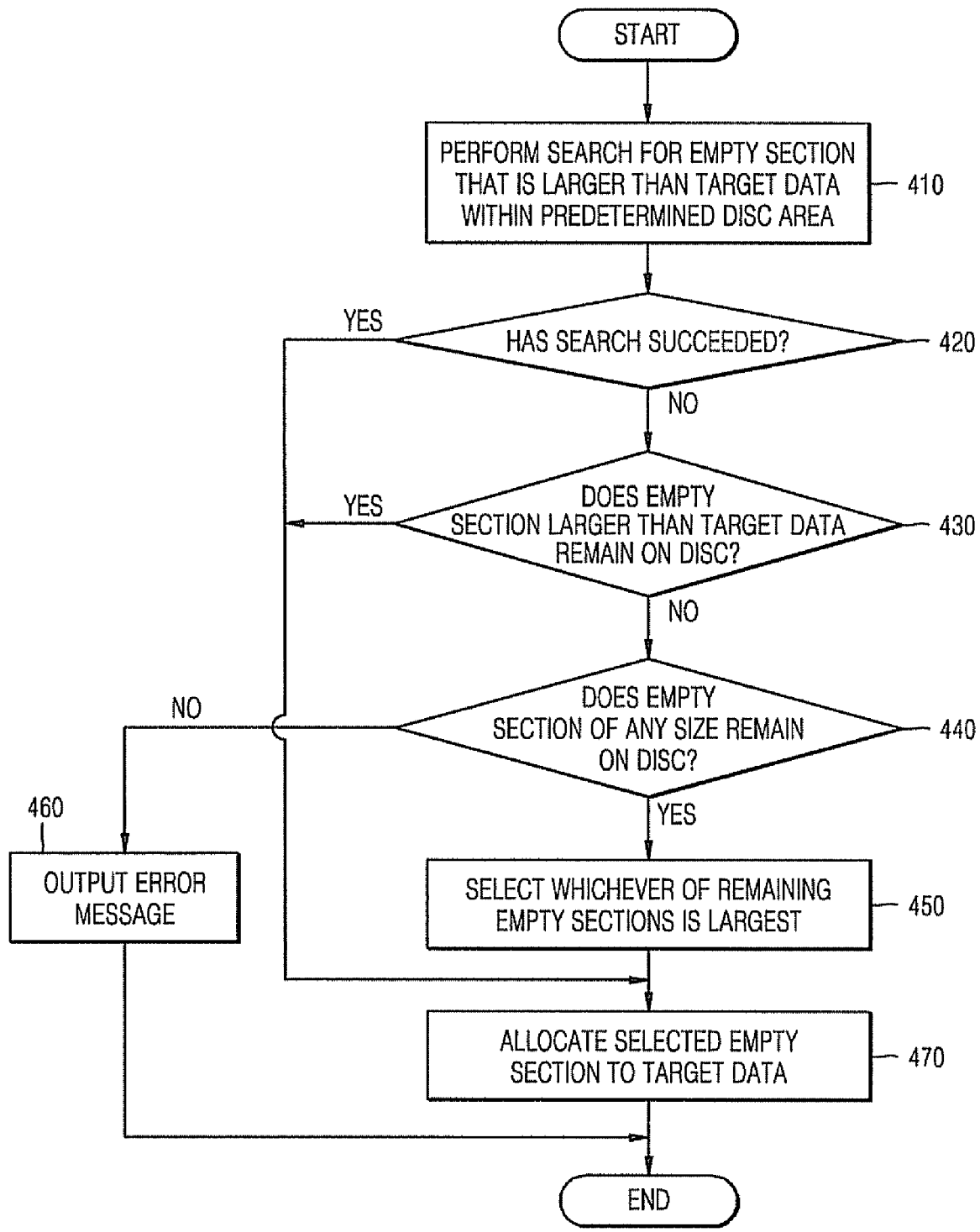
FIG. 4 is a flowchart illustrating an embodiment of the execution of a second algorithm.

FIG. 4 is a flowchart illustrating an embodiment of the execution of the second algorithm (i.e., operation 230 illustrated in FIG. 2). Referring to FIG. 4, in operation 410, a search for an empty section that is larger than the size of the target data is performed within a predetermined disc area. Here, the predetermined disc area may be restricted to a predetermined distance of a reference point. In operation 420, it is determined whether the search performed in operation 410 has succeeded. In operation 470, if it is determined in operation 420 that the search performed in operation 410 has succeeded, an empty section that is detected by the search is allocated to the target data. If more than one empty section is detected by the search, then whichever of the detected empty section is closer to the reference point may be allocated to the target data, thereby reducing a seek time.

In operation 430, if there is no empty section within the predetermined area that is larger than the size of the target data (operations 410 and 420), it is determined whether an empty section larger than the size of the target data remains outside of the predetermined disc area. In operation 470, if an empty section larger than the size of the target data remains outside the predetermined disc area (operation 430), then the corresponding empty section may be allocated to the target data in operation 470. If more than one empty section larger than the size of the target data is detected outside the predetermined disc area (operation 430), then whichever of the detected empty sections is closer to the reference point may be allocated to the target data in order to reduce seek time. It is understood that, if no predetermined area is selected, operations 420 and 430 can be combined.

In operation 440, if no empty section that is larger than the size of the target data remains on the disc (operation 430), it is determined whether an empty section of any size remains on the disc. In operation 460, if no empty section remains on the disc (operation 440), then an error message is output. In operation 450, if empty sections still remain on the disc (operation 440), then whichever of the remaining empty sections is largest is selected. In operation 470, the empty section selected in operation 450 is allocated to part of the target data.

In operation 410, manual inspection of each block of a file system may be needed to search the predetermined disc area for an empty section that is larger than the size of the target data. On the other hand, operations 430 and 440 may be performed simply by referencing a list managed by the file system, instead of manually inspecting each block of the file system. For example, XFS manages information regarding empty disc space according to the locations and sizes of empty sections using a B+tree. In this case, operations 430 and 440 may be performed with reference to the B+tree.

Figure 5:
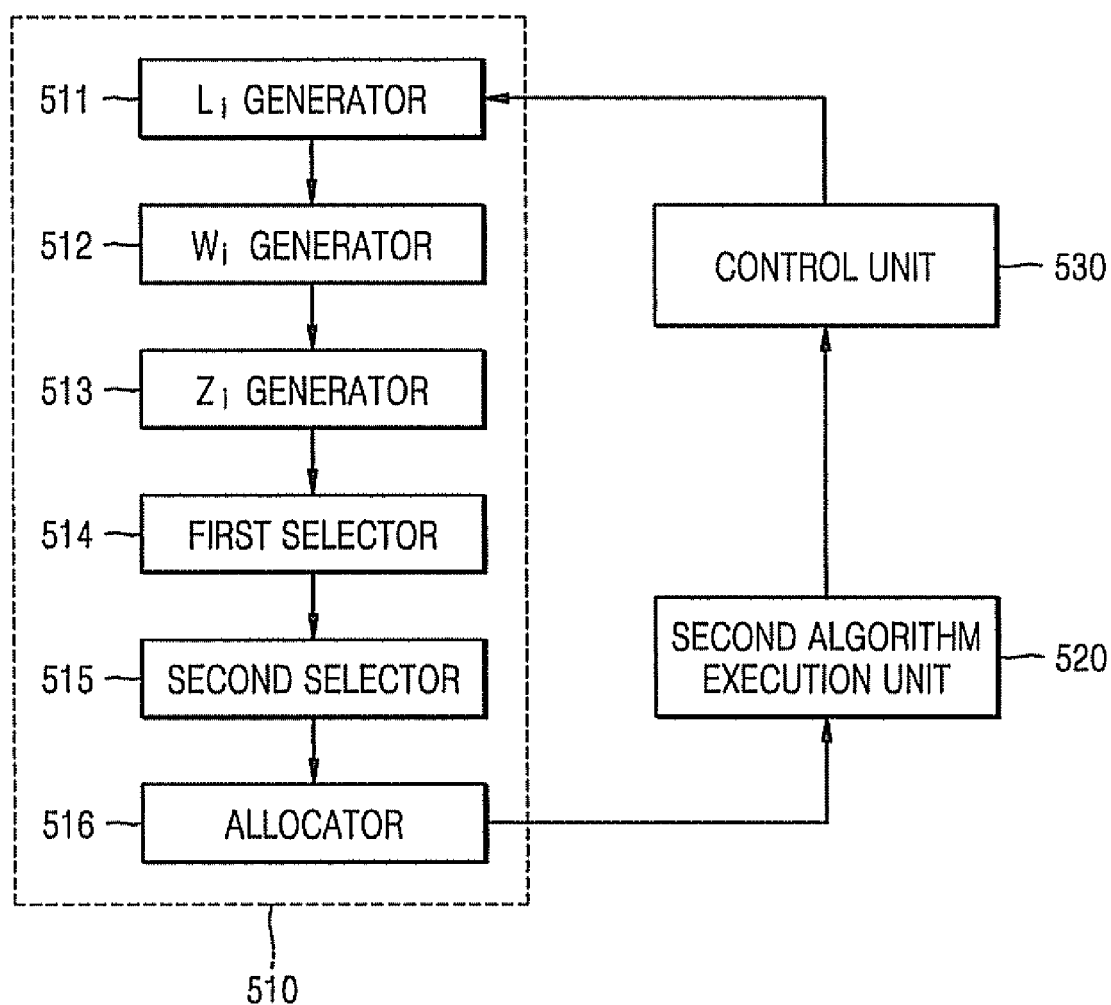
FIG. 5 is a block diagram of an apparatus for allocating disc space according to an embodiment of the present invention.

FIG. 5 is a block diagram of an apparatus for allocating disc space according to an embodiment of the present invention. Referring to FIG. 5, the apparatus includes a first algorithm execution unit 510, a second algorithm execution unit 520, and a control unit 530. The first algorithm execution unit 510 allocates empty space to target data by executing the first algorithm. The first algorithm execution unit 510 includes an $L_i$ generator 511, a $W_i$ generator 512, a $Z_i$ generator 513, a first selector 514, a second selector 515, and an allocator 516. While not required, the apparatus can be implemented in a recording and/or reproducing apparatus which records data in the allocated empty spaces.

The $L_i$ generator 511 determines $i_1$ and $i_2$ that are respectively the minimum and the maximum in the predetermined range, and creates $L_i$ as described above in relation to FIG. 3 according to the results of the determination. The $W_i$ generator 512 creates $W_i$, as described above in relation to FIG. 3, based on $L_i$. The $Z_i$ generator 513 creates $Z_i$, as described above in relation to FIG. 3, based on $W_i$. The first selector 514 chooses a set (i.e., $M_i$ of FIG. 3) that results in the shortest seek time from among a plurality of sets belonging to Z for each of the integer values within the predefined range. The second selector 515 chooses a set Min ($M_i$) that can result in the shortest seek time from the sets $M_i$ chosen by the first selector 514. The allocator 516 allocates a plurality of empty sections included in the set chosen by the second selector 515 to the target data. Each parameter has already been described in detail, and thus, detailed descriptions thereof will be skipped.

If the allocation of empty sections to the target data by the first algorithm execution unit 510 fails, the second algorithm execution unit 520 attempts to allocate one or more empty sections to the target data by executing the second algorithm. If no empty space remains on the disc, the second algorithm execution unit 520 outputs an error message indicating that insufficient space remains to record the target data.

If the second algorithm execution unit 520 fails to cover the entire target data by allocating disc space to only part of the target data, then the control unit 530 sets the size of a portion of target data remaining uncovered by the allocation as a new target data size, sets a point where the allocation of disc space by the second algorithm execution unit 250 has ended as a new reference point, and transmits the new reference point and the new target data size to the first algorithm execution unit 510 so that the first algorithm execution unit 510 can execute the first algorithm based on the new reference point and the new target data size. Also, the control unit 530 repeatedly performs the aforementioned process until the second algorithm execution unit 520 outputs an error message or until the entire target data is covered, thereby enabling the first and second algorithms to be alternately executed. While not shown, it is understood that the apparatus can further include an optical and/or magnetic head to transfer the target data with respect to a disc, and a controller to process the target data to be written in the allocated empty spaces. Examples of the apparatus can be media players, computers, disk drives, or like devices.

Figure 6:
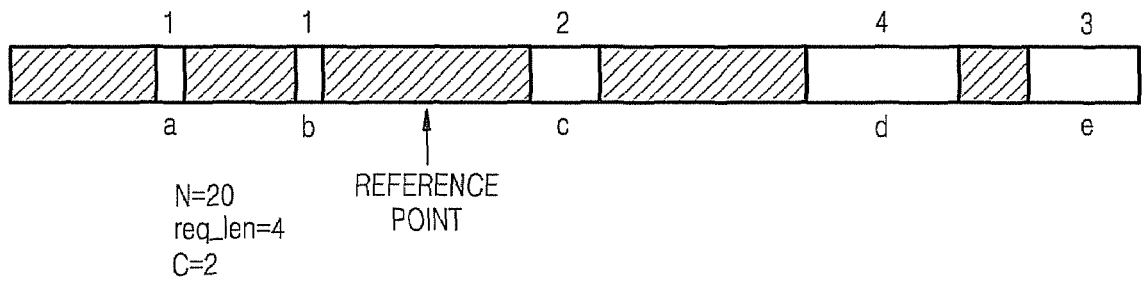
FIG. 6 is a diagram explaining a method of allocating disc space according to an embodiment of the present invention.

FIG. 6 is a diagram explaining a method of allocating disc space according to an embodiment of the present invention. Referring to FIG. 6, dark portions represent portions of a disc that have already been allocated, and bright portions represent empty portions of the disc yet to be allocated. Assume that portions of the disc other than those illustrated in FIG. 6 have all been allocated.

Referring to FIG. 6, empty sections a and b are located to the left of a reference point. The empty sections a and b have a size of 1 and are thus as large as one block. Empty sections c, d, and e are located to the right of the reference point. The empty sections c, d, and e respectively have sizes of 2, 4, and 3. In other words, the empty section c is twice as large as one block, the empty section d is four times as large as one block, and the empty section e is three times as large as one block. Assume that the size of the target data is 4 (blocks), that C=2, and that N=20 for the equations described above, $i_2 = \min(N, \lfloor \log_2(\text{req\_len}) \rfloor)$ and $i_1 = \max([\log_2(\text{req\_len})]-C, 0)$.

In this case, $i_2 = \min(20, \lfloor \log_2 4 \rfloor) = 2$, and $i_1 = \max([\log_2 4]-2, 0) = 0$. Accordingly, $L_2$, $L_1$, and $L_0$ are generated as follows:
$L_2$: {d};
$L_1$: {c, d, e}; and
$L_0$: {a, b, c, d, e}.
Thereafter, $W_i$ is determined as follows:
$W_2$: {d};
$W_1$: {c, d}; and
$W_0$: {a, b, c, d}.
Then, $Z_i$ is determined as follows:
$Z_2$: {d};
$Z_1$: {c, d}, {d}; and
$Z_0$: {a, b, c}, {b, c, d}, {c, d}, {d}.
Thereafter, a set that can result in a minimum seek time is chosen from among the sets belonging to each of $Z_0$ through $Z_2$, and the chosen sets are determined as M0 through $M_2$. Then, whichever of M0 through $M_2$ can result in the shortest seek time is allocated to the target data.

Figure 7:
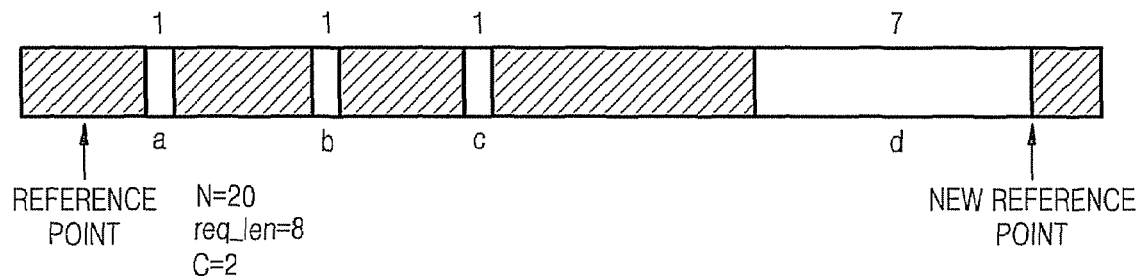
FIG. 7 is a diagram explaining a method of allocating disc space according to another embodiment of the present invention.

FIG. 7 is a diagram explaining a method of allocating disc space according to another embodiment of the present invention. Referring to FIG. 7, dark portions represent portions of a disc that have already been allocated, and bright portions represent empty portions of the disc yet to be allocated. Assume that portions of the disc other than those illustrated in FIG. 7 have all been allocated. Also, assume that the size of the target data is 8 blocks, that C=2, and that N=20.

In this case, $i_2 = \min(20, \lfloor \log_2 8 \rfloor) = 3$ and $i_1 = \max([\log_2 8]-2, 0) = 1$, $L_1$, $L_2$, and $L_3$ are generated as follows:
$L_3$: empty;
$L_2$: {d}; and
$L_1$: {d}.
Thereafter, $W_i$ is determined as follows:
$W_3$: empty;
$W_2$: {d}; and
$W_1$: {d}.
Thereafter, $Z_i$ is determined based on $W_i$. The only section that can be chosen in common from $W_2$ and $W_1$ is an empty section d. However, since the size of the empty section d is smaller than the size of the target data, it is determined that the allocation of disc space to the target data using the first algorithm has failed. Thus, the second algorithm is executed.

Referring to FIGS. 4 and 7, none of the empty sections a, b, c, and d are larger than the size of the target data (operation 410). Thus, the empty section d, which is the largest empty section, is allocated first to part of the target data (operation 450). As a result, a portion of the target data having the size of one block remains uncovered by the allocation of the empty section d. Therefore, the end of the empty section d is set as a new reference point, and the size of the remaining portion of the target data is set as a new target data size. Thereafter, the first algorithm is executed again. In this case, $i_2 = \min(20, \lfloor \log_2 1 \rfloor) = 0$ and $i_1 = \max([\log_2 1]-2, 0) = 0$. Accordingly, $L_0$ is generated as follows: $L_0$: {a, b, c} and $W_0$ is determined as follows: $W_0$: {c}. Then, $Z_0$ is determined as follows: $Z_0$: {c}. Accordingly, the empty section c is additionally allocated to the target data. In short, according to the present embodiment, the empty sections c and d are allocated to the target data.

Figure 8:
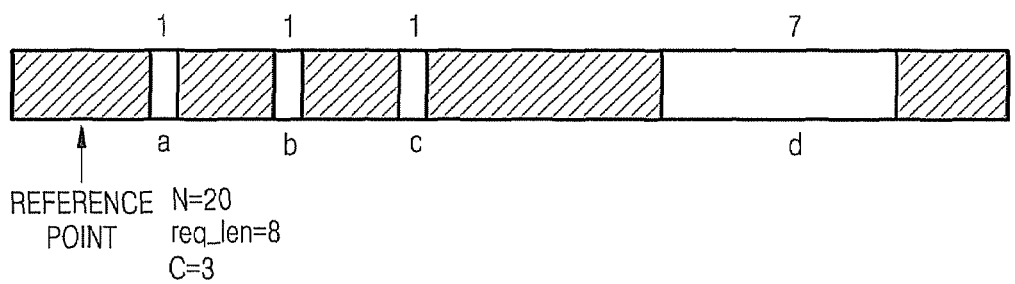
FIG. 8 is a diagram explaining a method of allocating disc space according to another embodiment of the present invention.

FIG. 8 is a diagram explaining a method of allocating disc space according to another embodiment of the present invention. The state of the disc illustrated in FIG. 8 is the same as the state of the disc illustrated in FIG. 7 except that C=3. That is, the size of the target data is 8, C=3, and N=20

The first algorithm is executed. Since $i_2 = \min(20, \lfloor \log_2 8 \rfloor) = 3$ and $i_1 = \max([\log_2 8]-3, 0) = 0$, $L_0$, $L_1$, $L_2$, and $L_3$ are generated as follows:
$L_3$: empty;
$L_2$: {d};
$L_1$: {d}; and
$L_0$: {a, b, c, d}.

Thereafter, $W_i$ is determined as follows:
$W_3$: empty;
$W_2$: {d};
$W_1$: {d}; and
$W_0$: {a, b, c, d}.
Then, $Z_i$ is determined as follows:
$Z_3$: empty;
$Z_2$: empty;
$Z_1$: empty; and
$Z_0$: {a, b, c, d}.

In short, according to the example embodiment, empty sections a, b, c, and d are allocated to target data.

The embodiment illustrated in FIG. 8 is different from the embodiment illustrated in FIG. 7 in that the range of i values is expanded by setting the constant C to 3 rather than to 2. Thus, the embodiment illustrated in FIG. 8 provides different disc space allocation results from the embodiment illustrated in FIG. 7. In other words, the value of the constant C affects disc space allocation results. Accordingly, it is possible to obtain optimum disc space allocation results by appropriately adjusting the value of the constant C.

Figure 9:
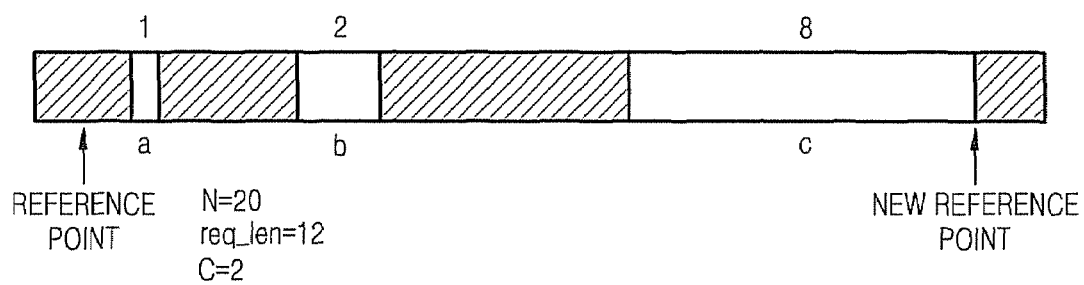
FIG. 9 is a diagram explaining a method of allocating disc space according to another embodiment of the present invention.

FIG. 9 is a diagram explaining a method of allocating disc space according to another embodiment of the present invention. Referring to FIG. 9, assume that the size of target data is 12 blocks, that C=2, and that N=20. Referring to FIG. 9, dark portions represent portions of a disc that have already been allocated, and bright portions represent empty portions of the disc yet to be allocated. Assume that portions of the disc other than those illustrated in FIG. 9 have all been allocated.

Since $i_2 = \min(20, \lceil \log_2 12 \rceil) = 4$ and $i_1 = \max(\lceil \log_2 12 \rceil - 2, 0) = 2$, $L_2$, $L_3$, and $L_4$ are generated as follows:
$L_4$: empty;
$L_3$: {c}; and
$L_2$: {C}.
Then, $W_i$ (where i is an integer between 2 and 4) is determined as follows:
$W_4$: empty;
$W_3$: {c}; and
$W_2$: {c}.
Thereafter, $Z_i$ is determined based on $W_i$ and is as follows:
$Z_4$: empty;
$Z_3$: empty; and
$Z_2$: empty.

Since the allocation of disc space to the target data through the first algorithm has failed, the second algorithm is executed. Referring to FIG. 4 and the empty sections a, b, and c illustrated in FIG. 9, the empty section c is the largest empty section. Thus, the empty section c is allocated to part of the target data first (operation 450). As a result, a portion of the target data having the size of 4 blocks remains uncovered by the allocation of the empty section c. Then, the end of the empty section c is set as a new reference point, and the size of the remaining portion of the target data (i.e., 4) is set as a new target data size. Thereafter, the first algorithm is executed again. Then, $i_2 = \min(20, \lceil \log_2 4 \rceil) = 2$, and $i_1 = \max(\lceil \log_2 4 \rceil - 2, 0) = 0$. Accordingly, $L_0$, $L_1$, and $L_2$ are generated as follows:
$L_2$: empty;
$L_1$: {b}; and
$L_0$: {a, b}.
Then, $W_i$ is determined as follows:
$W_2$: empty;
$W_1$: {b}; and
$W_0$: {a, b}.

Since the size of the empty sections a and b combined is smaller than the new target data size, i.e., 4, it is determined that the first algorithm has failed. Accordingly, the second algorithm is executed again. Since the empty section c has already been allocated to the target data, the empty section b, which is the largest empty section, is allocated to the remaining portion of the target data. As a result, a portion of the target data having the size of two blocks remains uncovered by the allocation of the empty section b, and the empty section a is the only empty section left. In this case, the first algorithm is executed again. Since the size of the empty section a is smaller than the size of the remaining portion of the target data, i.e., 2, the second algorithm is executed again. As a result of the second algorithm, the empty section a is allocated to the target data. Thereafter, the first algorithm is executed again. Since no empty section remains after the allocation of the empty section a, the second algorithm is executed, and as a result, an error message is output (operation 460).

Aspects of the present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing aspects of the present invention can be easily construed by one of ordinary skill in the art.

It is noted that in some alternative implementations, the functions noted in the blocks of the flowcharts described above may occur out of order. For example, two blocks shown in succession may in fact be executed substantially concurrently or the blocks may sometimes be executed in reverse order depending upon the functionality involved. More specifically, for example, according to an aspect of the present invention, the second algorithm may be executed prior to the first algorithm. Furthermore, in some alternative implementations, blocks may be omitted. For example, the first algorithm may be omitted and the second algorithm may be repeated until all of the data has an allocated disc space.

According to aspects of the present invention, it is possible to effectively allocate empty disc space in consideration of both the distances of empty disc sections to a reference point and seek time thus reducing the time taken to seek target data compared to methods of allocating disc space that only consider the distances of empty disc sections to a reference point. Aspects of the invention can be implemented using magnetic, magneto optical, and/or optical recording media for use with computers, portable computing devices, portable media players, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of allocating disc space for recording data on a disc, the method comprising:
    performing a first series of operations including:
        generating, by a computer, a number of first sets based on a range of values, each first set corresponding to one different value from the range and each first set including all empty sections of the disc that are larger than a size corresponding to the one different value from the range;

generating, by the computer, a number of second sets per each of the first sets, each second set derived from the empty sections of the corresponding first set;

determining, by the computer, whether any second set includes an empty section that is equal to or larger than a size of the data;

determining, by the computer, whether any second set includes two or more empty sections from the corresponding first set that are equal to or larger than the size of the data when combined; and allocating by the computer, to the data, an optimum set from among all of the second sets that results in a shortest seek time from a predetermined reference point when the computer determines that at least one second set includes an empty section equal to or larger than the size of the data or two or more empty sections that are equal to or larger than the size of the data when combined.

2. The method as claimed in claim 1, further comprising:
a second series of operations including:
determining whether an empty section that is larger than the size of the data and within a predetermined distance of the reference point exists when it is determined by the computer that no second set includes a empty section equal to or larger than the size of the data or two or more empty sections larger than the size of the data when combined; and allocating the empty section, to the data, that is located within the predetermined distance of the reference point and that is larger than the size of the data when the computer determines that the empty section that is larger than the data and within a predetermined range of the reference point exists.

3. The method as claimed in claim 2, wherein the second series of operations further comprises:
determining whether an empty section that is outside of the predetermined distance from the reference point and larger than the size of the data exists when the computer determines that no empty section that is larger than the data and within the predetermined distance of the reference point exists;

allocating an empty section, to the data, that is outside of the predetermined distance from the reference point and is larger than the size of the data when the computer determines that the empty section that is outside of the predetermined range of the reference point and that is larger than the size of the data exists.

4. The method as claimed in claim 3, wherein the second series of operations further comprises:
determining by the computer whether any empty section that is larger than the data exits on the disc; and
allocating a largest empty section on the disk to a part of the data when the computer determines no empty section that is larger than the data exists on the disc.

5. The method as claimed in claim 4, wherein allocating the largest empty section comprises:
setting an end of the allocated largest empty section as a new reference point;
setting a size of a remainder of the data as a new data size; and the method further comprises performing the first series of operations again.

6. The method as claimed in claim 5 further comprising: repeating the second series of operations and the first series of operations until all of the data has the disc space allocated thereto or until no empty sections remain on the disc.

7. The method as claimed in claim 6, further comprising: outputting an error message if no empty sections remain on the disc.

8. The method as claimed in claim 4, further comprising: outputting an error message if no empty sections remain on the disc.

9. The method as claimed in claim 3, wherein allocating the empty section that is outside of the predetermined distance comprises:
allocating an empty section, from a plurality of empty sections that are outside of the predetermined distance and larger than the size of the data, that is closest to the reference point.

10. The method as claimed in claim 2, wherein allocating the empty section that is located within the predetermined distance comprises:
allocating an empty section, from a plurality of empty sections that are within the predetermined distance and larger than the size of the data, that is closest to the reference point.

11. The method as claimed in claim 1, wherein:
generating a number of first sets based on a range of values each first set corresponding to one different value from the range comprises generating a set $L_i$ for each of one or more values of i, where i is the one different value from the range and is an integer within the range, each set $L_i$ including any empty sections that are each larger than a size of $2^i$ blocks, where a block is a storage unit of the disc; and generating the second sets comprises:
generating a set $W_i$ for each of the one or more values of i, each comprising one or more empty sections within a predetermined distance from the predetermined reference point from among any of the empty sections of the corresponding set $L_i$; and generating a set $Z_i$ for each of the one or more values of i, each comprising one or more sets of any consecutive empty sections $Z_{i1}, Z_{i2}, \ldots,$ and $Z_{iw}$ included in the corresponding set $W_i$ such that a size of the consecutive empty sections is equal to or larger than the size of the data, where w is a minimum value for securing empty space larger than the size of the data.

12. The method as claimed in claim 11, wherein allocating the optimum set comprises:
generating a set $M_i$ from the one more sets of each set $Z_i$ that results in the shortest seek time for each of the one or more values of i;
selecting the optimum set min($M_i$) from the one or more third sets that results in the shortest seek time; and
allocating one or more empty sections of the optimum set min($M_i$) to the data,
wherein $I(z_{i1})+I(z_{i2})+ \ldots +I(z_{iw}) \geq$ req_len, and $I(z_{i1})+I(z_{i2})+ \ldots +I(z_{i(w-1)})<$req_len, where x indicates an empty section, I(x) indicates a size of the section x, and req_len indicates the size of the data.

13. The method as claimed in claim 12, wherein the range of values is from i1 to i2, i1≦i≦i2, i2 =min(N,]$\log_2$(req_len)[), and i1=max([$\log_2$(req_len)]−C, 0), where req_len indicates the size of the data, C is a constant, N=[$\log_2$(V/B)], V indicates a storage capacity of the disc, B indicates a size of the block, ][ is a mathematical operator that raises a value to a closest integer greater than an original value, and [] is a mathematical operator that lowers the value to a closest integer less than the original value.

14. The method as claimed in claim 11, wherein:
the set $W_i$ comprises u empty sections $I_1, I_2, I_3, \ldots,$ and $I_u$ that are included in the set $L_i$ and are located on a first side of the reference point and v empty sections $r_1, r_2, r_3, \ldots,$ and $r_v$ that are included in the set $L_i$ and are located on a second side of the reference point; and $u \geq ]req\_len/2^i[$, $I(I_1)+I(I_2)+ \ldots I(I_u) \geq req\_len$ and $(I_1)+I(I_2)+ \ldots I(I_{u-1}) < req\_len$ or $I(I_1)+I(I_2)+ \ldots I(I_u) < req\_len$, $v \geq ]req\_len/2^i[$, $I(r_1)+I(r_2)+ \ldots I(r_v) \geq req\_len$ and $I(r_1)+I(r_2)+ \ldots I(r_{v-1}) < req\_len$ or $I(r_1)+I(r_2)+ \ldots I(r_v) \geq req\_len$, where x indicates an empty section, I(x) indicates a size of the empty section x, req_len indicates the size of the data, ][ is a mathematical operator that raises a value to a closest integer greater than an original value, and [] is a mathematical operator that lowers the value to a closest integer less than the original value.

15. The method as claimed in claim 1, wherein the allocating of the optimum set comprises:
    selecting a third set from each second set that results in the shortest seek time;
    selecting the optimum set from the one or more third sets that results in the shortest seek time; and
    allocating the one or more empty sections of the optimum set to the data.

16. A computer-readable storage medium storing instructions configured to cause a computer to:
    generate a number of first sets based on a range of values, each first set corresponding to one different value from the range, each first set including all empty sections of the disc that are larger than a size corresponding to the one different value from the range;
    generate a number of second sets per each of the first sets, each second set derived from the empty sections of the corresponding first set;
    determining whether any second set includes an empty section that is equal to or larger than a size of the data;
    determine whether any second set includes two or more empty sections from the corresponding first set that are equal to or larger than the size of the data when combined; and
    allocate, to the data, an optimum set from among the second sets that results in a shortest seek time from a predetermined reference point when the computer determines that at least one second set includes one empty section equal to or larger than the size of the data or two or more empty sections that are equal to or larger than the size of the data when combined.

17. An apparatus for allocating disc space for recording data on a disc, the apparatus comprising:
    a first algorithm execution unit to perform a first series of operations to:
    generate a number of first sets based on a range of values, each first set corresponding to one different value from the range, each first set including all empty sections of the disc that are larger than a size corresponding to the one different value from the range;
    generate a number of second sets per each of the first sets, each second set derived from the empty sections of the corresponding first set;
    determining whether any second set includes an empty section that is equal to or larger than a size of the data;
    determine whether any second set includes at least one set of two or more empty sections from the corresponding first set that are equal to or larger than the size of the data when combined; and
    allocate to the data, an optimum set from among all of the second sets that results in a shortest seek time from a predetermined reference point when the computer determines that one or more second sets an empty section equal to or larger than the size of the data or two or more empty sections that are equal to or larger than the size of the data when combined.

18. The apparatus as claimed in claim 17, further comprising:
    a second algorithm execution unit to perform a second series of operations to:
    determine whether an empty section that is larger than the data and within a predetermined distance of the reference point exists when it is determined by the second algorithm execution unit that no second set includes an empty section equal to or larger than the size of the data or two or more empty sections larger than the size of the data when combined; and
    allocate the empty section, to the data, that is located within the predetermined distance of the reference point and that is larger than the size of the data when the second algorithm execution unit determines that the empty section that is larger than the data and within a predetermined range of the reference point exists.

19. The apparatus as claimed in claim 18, wherein the second series of operations performed by the second algorithm execution unit includes further operations to:
    determine whether an empty section that is outside of the predetermined distance from the reference point and larger than the size of the data exists when the second algorithm execution unit determines that no empty section that is larger than the data and within the predetermined distance of the reference point exists; and
    allocate an empty section, to the data, that is outside of the predetermined-distance from the reference point and is larger than the size of the data when the second algorithm execution unit determines that the empty section that is outside of the predetermined range of the reference point and that is larger than the size of the data exists.

20. The apparatus as claimed in claim 19, wherein the second series of operations performed by the second algorithm execution unit includes further operations to:
    determine whether any empty section that is larger than the data exits on the disc; and
    allocate a largest empty section on the disk to a part of the data when the second algorithm execution unit determines no empty section that is larger than the data exists on the disc.

21. The apparatus as claimed in claim 20, further comprising a control unit to set an end of the allocated largest empty section as a new reference point and set a size of a remainder of the data not allocated as a new data size; and control to control the first algorithm execution unit to perform the first series of operations and, if necessary, to control the second algorithm execution unit to perform the second series of operations again.

22. The apparatus as claimed in claim 21, wherein the control unit is configured to repeatedly control the first algorithm execution unit to perform the first series of operations and to control the second algorithm execution unit to perform the second series of operations until all of the data has the disc space allocated thereto or until no empty sections remain on the disc.

23. The apparatus as claimed in claim 22, wherein the second algorithm execution unit is configured to output an error message if no empty sections remain on the disc.

24. The apparatus as claimed in claim 20, wherein the second algorithm execution unit is configured to output an error message if no empty sections remain on the disc.

25. The apparatus as claimed in claim 19, wherein, the second algorithm execution unit is configured to allocate an empty section, from a plurality of empty sections that are outside of the predetermined distance and larger than the size of the data, that is closest to the reference point.

26. The apparatus as claimed in claim 18, wherein, the second algorithm execution unit is configured to allocate an empty section, from a plurality of empty sections that are within the predetermined distance and larger than the size of that data, that is closest to the reference point.

27. The apparatus as claimed in claim 17, wherein the first algorithm execution unit comprises:
an $L_i$ generator to generate a set $L_i$ for each of one or more values of I where i is the one different value from the range and is an integer within the range, each set $L_i$ including any empty sections that are each larger than a size of $2^i$ blocks, where a block is a storage unit of the disc;
a $W_i$ generator to generate a set $W_i$ for each of one or more values of i, each comprising one or more empty sections within a predetermined distance from the predetermined reference point from among any of the empty sections of the corresponding set $L_i$;
a $Z_i$ generator to generate a set $Z_i$ for each of the one or more values of i, each comprising one or more sets of any consecutive empty sections $z_{i1}, z_{i2}, \ldots,$ and $z_{iw}$ included in the corresponding set $W_i$ such that a size of the consecutive empty sections is equal to or larger than the size of the data, where w is a minimum value for securing empty space larger than the size of the data.

28. The apparatus as claimed in claim 27, wherein the first algorithm execution unit further comprises:
a first selector to select a set $M_i$ from the one more sets of each set $Z_i$ that results in the shortest seek time for each of the one or more values of i;
a second selector to select the optimum set $\min(M_i)$ from the one or more first selector sets that results in the shortest seek time; and
an allocator to allocate of one or more empty sections of the optimum set $\min(M_i)$ to the data, wherein $I(z_{i1})+I(z_{i2})+ \ldots +I(z_{iw}) \geq \text{req\_len}$, and $I(z_{i1})+I(z_{i2})+ \ldots +I(z_{i(w-1)}) < \text{req\_len}$, where x indicates an empty section, I(x) indicates a size of the section x, and req_len indicates the size of the data.

29. The apparatus as claimed in claim 28, wherein the range of values is from i1 to i2, $i1 \leq i \leq i2$, $i2 = \min(N, ]\log_2(\text{req\_len})[)$, and $i1 = \max([\log_2(\text{req\_len})]-C, 0)$, where req_len indicates the size of the data, C is a constant, $N=[\log_2(V/B)]$, V indicates a storage capacity of the disc, B indicates a size of the block, ][ is a mathematical operator that raises a value to a closest integer greater than an original value, and [] is a mathematical operator that lowers the value to a closest integer less than the original value.

30. The apparatus as claimed in claim 27, wherein:
the set $W_i$ comprises u empty sections $I_1, I_2, I_3, \ldots,$ and $I_u$ that are included in the set $L_i$ and are located on a first side of the reference point and v empty sections $r_1, r_2, r_3, \ldots,$ and $r_v$ that are included in the set $L_i$ and are located on a second side of the reference point; and
$u \leq ]\text{req\_len}/2^i[$, $I(I_1)+I(I_2)+ \ldots I(I_u) \geq \text{req\_len}$ and $(I_1)+I(I_2)+ \ldots I(I_{u-1}) < \text{req\_len}$ or $I(I_1)+I(I_2)+ \ldots I(I_u) < \text{req\_len}$, $v \leq ]\text{req\_len}/2^i[$, $I(r_1)+I(r_2)+ \ldots I(r_v) \geq \text{req\_len}$ and $I(r_1)+I(r_2)+ \ldots I(r_{v-1}) < \text{req\_len}$ or $I(r_1)+I(r_2)+ \ldots I(r_v) < \text{req\_len}$, where x indicates an empty section, I(x) indicates a size of the empty section x, req_len indicates the size of the data, ][ is a mathematical operator that raises a value to a closest integer greater than an original value, and [] is a mathematical operator that lowers the value to a closest integer less than the original value.

31. The apparatus as claimed in claim 17, wherein the first algorithm execution unit comprises an allocator to select a third set from each second set that results in the shortest seek time, to select the optimum set from the one or more third sets that results in the shortest seek time, and to allocate the one or more empty sections of the optimum set to the data.

* * * * *